United States Patent
Yamamoto et al.

(10) Patent No.: US 8,363,634 B2
(45) Date of Patent: Jan. 29, 2013

(54) WIRELESS COMMUNICATION METHOD, WIRELESS COMMUNICATION APPARATUS AND ACCESS POINT APPARATUS

(75) Inventors: Keisuke Yamamoto, Kokubunji (JP); Shigenori Hayase, Kodaira (JP); Masaaki Shida, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 1378 days.

(21) Appl. No.: 11/797,180

(22) Filed: May 1, 2007

(65) Prior Publication Data

US 2007/0286149 A1 Dec. 13, 2007

(30) Foreign Application Priority Data

Jun. 8, 2006 (JP) .................. 2006-159232

(51) Int. Cl.
*H04J 3/00* (2006.01)
*H04J 3/24* (2006.01)
*H04J 3/18* (2006.01)
*H04M 1/00* (2006.01)
(52) U.S. Cl. ...... 370/345; 370/474; 370/477; 455/562.1
(58) Field of Classification Search .................. 370/345, 370/474, 477; 455/562.1
See application file for complete search history.

(56) References Cited

U.S. PATENT DOCUMENTS

| | | | |
|---|---|---|---|
| 6,721,302 B1 * | 4/2004 | Alastalo | 370/346 |
| 6,934,752 B1 * | 8/2005 | Gubbi | 709/225 |
| 2004/0037235 A1 | 2/2004 | Kadous | |
| 2004/0252632 A1 | 12/2004 | Bourdoux et al. | |
| 2005/0138194 A1 * | 6/2005 | Lu et al. | 709/230 |
| 2005/0144307 A1 * | 6/2005 | Li et al. | 709/232 |
| 2005/0288062 A1 | 12/2005 | Hammerschmidt et al. | |
| 2006/0019677 A1 * | 1/2006 | Teague et al. | 455/456.3 |
| 2006/0193373 A1 * | 8/2006 | Agee et al. | 375/141 |
| 2007/0058595 A1 * | 3/2007 | Classon et al. | 370/337 |

FOREIGN PATENT DOCUMENTS

JP 2005-102136 4/2005

OTHER PUBLICATIONS

Japanese language Office Action issued Feb. 1, 2011 in the corresponding Japanese Patent Application No. 2006-159232 (3 pages) with a Partial English language Translation (2 pages).
Search Report, issued from the European Patent Office, in corresponding European Application No. EP 07 00 8982, dated Jun. 1, 2012, pp. 1-6.

* cited by examiner

*Primary Examiner* — Ariel Balaoing
(74) *Attorney, Agent, or Firm* — Stites & Harbison, PLLC; Juan Carlos A. Marquez, Esq; Nicholas B. Trenkle

(57) ABSTRACT

In a system in which a host and a plurality of terminals simultaneously communicate with each other under the SDMA scheme, transmission parameters to be used for generating frames for SDMA transmission to the respective terminals are adjusted in consideration of the transmission time durations necessary for transmission of other frames to be transmitted simultaneously with the first-mentioned frames, so that differences between the frame transmission time durations are reduced.

18 Claims, 7 Drawing Sheets

WIRELESS COMMUNICATION METHOD, WIRELESS COMMUNICATION APPARATUS AND ACCESS POINT APPARATUS

INCORPORATION BY REFERENCE

The present application claims priority from Japanese application JP 2006-159232 filed on Jun. 8, 2006, the content of which is hereby incorporated by reference into this application.

BACKGROUND OF THE INVENTION

The present invention relates to wireless communication methods and wireless communication apparatus, particularly to those utilizing the SDMA (Space Division Multiple Access).

Figure 1:
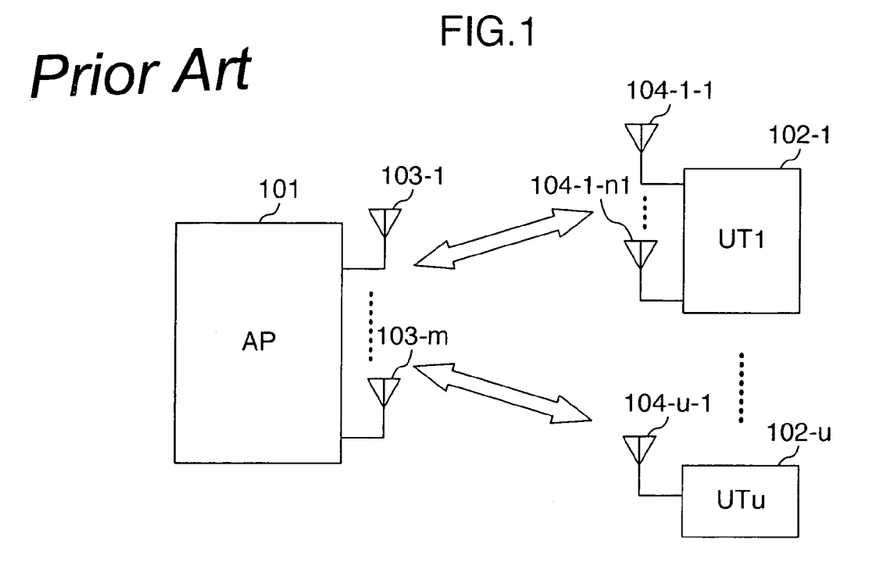
FIG. 1 is a diagram showing a wireless communication system using the SDMA.

Various multiple access schemes have heretofore been known for realizing the multi-user access in the wireless communications. The SDMA is one of the multiple access schemes aiming at improvements on the spectral efficiency, in which use is made of a plurality of antennas for establishing spatially divided or separated propagation paths for simultaneous multiple access using the same frequency. In recent years, owing to the development of the MIMO (Multiple-Input Multiple-Output) wireless communication schemes, technologies have been laid open in which space division multiplex wireless communication technologies utilizing the MIMO have been extended to implement the multiple user access. FIG. 1 is a schematic diagram of a wireless communication system utilizing the SDMA. In this drawing, it is illustrated that communications are achieved between an access point (AP) 101 and u user terminals (UT's) 102-1 to 102-u, implementing the SDMA. An example of the implementation of the SDMA is described in U.S. Patent Publication No. 2004/0252632A1, which is incorporated by reference.

SUMMARY OF THE INVENTION

Among wireless communications systems, a system is known in which data communication is performed in the packet switching mode with common channels under the time division scheme. IEEE 802.11, the standard for the wireless LAN in which the CSMA/CA (Carrier Sense Multiple Access with Collision Avoidance) is employed for access control corresponds to the above-mentioned system. In this wireless communication system, a packet (or a frame or a data unit), which is a group of data, constitutes a unit in the data communication. The packet has a variable data size or a variable data length, and a terminal transmitting data occupies a channel until transmission of one packet has been finished and releases it to another terminal after the transmission of the packet.

By applying the SDMA to a packet communication system in which the wireless resources are shared under the time division multiplexing (TDM), a plurality of terminals are allowed to share a channel on a single frequency channel occupation time-base axis owing to the employment of a plurality of spatial multipath routes, thereby to improve the communication capacity or the throughput of the overall system.

However, a mere application of the SDMA to the TDM packet communication system may not bring out a considerable improvement of the communication capacity. As mentioned above, a packet has a data size of variable length, and generally, different packets have different data sizes. In a communication system capable of a variable data rate, even packets of the same size may require significantly different time durations of packet transmission depending on the data rate. When a plurality of those packets which have different time durations necessary for data transmission are transmitted under the SDMA scheme, for a multipath route assigned to a packet having a relatively shorter time duration for transmission, a channel (the frequency, and time-base axis resources) is continued to be occupied even after transmission of the packet has been completed so that only a portion of the multipath route will be free wireless communication resources. Since the spatially divided or separated paths are different for each combination of antennas, it will only be to communications between the terminals having completed the packet transmission that the free wireless communication resources are available.

Further, when switching is effected between transmission and reception operation modes in a system using the TDD (Time Division Duplexing) or when switching of connection is effected between a plurality of terminals by employing the TDMA (Time Division Multiple Access), in a state in which a plurality of data streams are communicated by using the same channel and one of the data steams is communicated with a longest transmission time duration, the data steams which are other than the above-mentioned one data stream having the longest transmission time duration and are simultaneously transmitted under the SDMA scheme will suffer a wait condition until the communication of the above-mentioned one data stream has been finished. The data streams transmitted over the multipath route having this free time suffer a decrease of the communication capacity as compared to the communication capacity which they should otherwise enjoy, and an increase of a transmission delay may be encountered due to the free time. In addition, in a system employing the TDD and requiring an acknowledgement (ACK) for each packet transmission, the above-described free resources will be one of the causes of a large decrease of the communication capacity.

Figure 2:
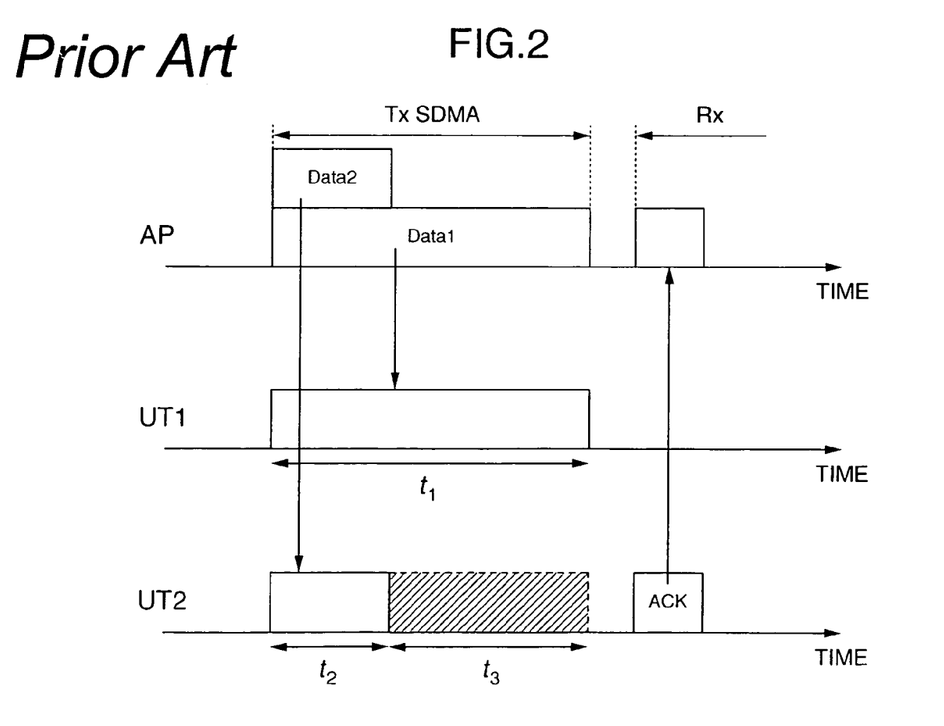
FIG. 2 is a time chart of frame transmission and reception in the prior art SDMA transmission system.

FIG. 2 illustrates an example of SDMA transmission in a communication system in which uplink and downlink communications of packets are performed using the time division scheme. In the drawing, AP transmits Data 1 and Data 2 to two UTs, respectively, using the SDMA, in which the time necessary for the SDMA transmission is determined by a transmission time duration $t_1$ for Data 1 and the data stream to the UT2 suffers a free time $t_3=t_1-t_2$. Namely, for the data stream to the UT2, an amount of data, which should essentially be transmitted during a time duration $t_2$, actually needs a time duration $t_1$, with a result that the originally intended communication capacity has not been achieved.

An object of the present invention is to provide a wireless communication method, a wireless communication system and an access point apparatus, which is substantially free from the problems heretofore encountered with the above-mentioned prior art.

Another object of the present invention is to provide techniques for suppressing generation of losses in the multipath route to improve the performance (the robustness or throughput) of and the communication capacity of the communication system.

According to an aspect of the present invention, for transmission of a plurality of different packets between an access point apparatus and a plurality of user terminals by using the SDMA, a transmission parameter employed in transmitting each packet is controlled on the basis of the time duration necessary for simultaneously transmitting, by using the SDMA, a plurality of packets, so that time durations necessary for transmitting the said plurality of different packets are made close to one another, thereby to provide satisfactory performance of communication.

A first feature of the present invention lies in a wireless communication system in which an access point apparatus having a plurality of antennas simultaneously transmits, by using the SDMA, different packets to a plurality of user terminals each having at least one antenna, wherein the access point apparatus has a unit for predicting channel conditions to be employed in the SDMA transmission, a unit for determining a data rate from the predicted channel conditions, a unit for predicting, from the determined data rate, transmission time durations necessary for SDMA transmission of a plurality of the different packets and a unit for determining, on the basis of the predicted transmission time durations, a transmission parameter to be employed in the transmission of the respective packets.

A second feature of the present invention lies in a wireless communication system having the first feature, wherein, in generating a frame for transmission of a packet, a data size or a data length of the frame is set for a value different from that of the packet from which the frame originates so that the packet is fragmented or divided into a plurality of frames.

A third feature of the present invention lies in a wireless communication system having the first feature, wherein the data rate in the generation of the frame, which is a predetermined data rate, is modified on the basis of a difference between time durations necessary for transmission of the respective packets.

A fourth feature of the present invention lies in a wireless communication system having the first feature, wherein both of the data size and the data rate are modified in the generation of the frame.

A fifth feature of the present invention lies in a wireless communication system having the third feature, wherein the modification of the data rate is effected by at least one of a change of a transmission weight and a change of a reception weight.

In one aspect of the present invention, it is possible to improve the performance of communication, at the time of SDMA transmission of a plurality of packets having different transmission time durations, in a TDM packet communication system.

Other objects, features and advantages of the invention will become apparent from the following description of the embodiments of the invention taken in conjunction with the accompanying drawings.

DETAILED DESCRIPTION OF THE EMBODIMENTS

Some embodiments of the present invention will be described hereinbelow.

Figure 3:
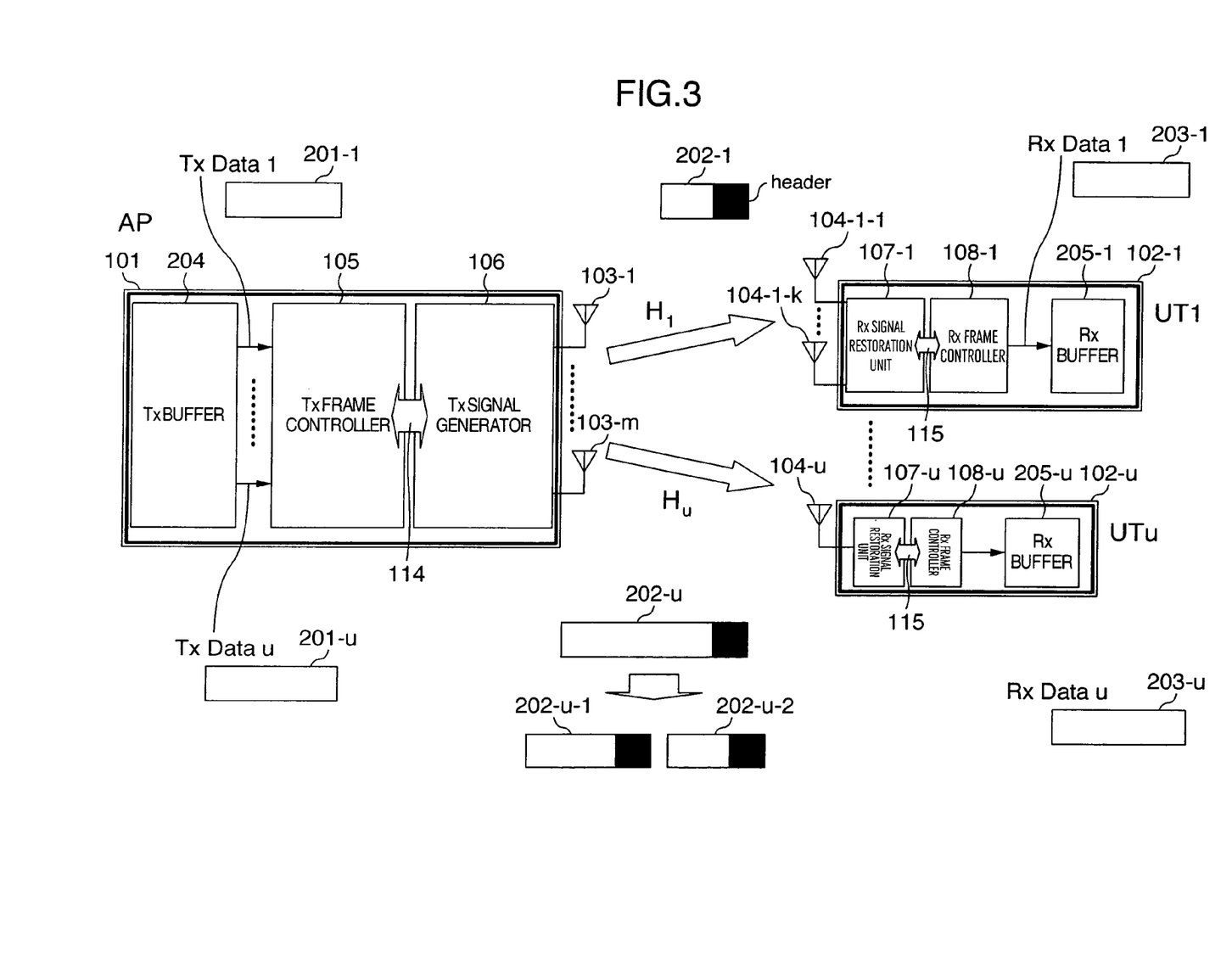
FIG. 3 is a diagram of a wireless communication system according to an embodiment of the present invention.

An embodiment will now be described with reference to FIG. 3, which shows a wireless communication system. FIG. 3 illustrates a case in which u transmission data 201-1 to 201-u are transmitted from an access point apparatus (hereafter referred to as "AP" for convenience sake) 101 to user terminals (hereafter referred to as "UT" for convenience sake) 102-1 to 102-u, by using the SDMA transmission scheme. In FIG. 3, the AP and the UT's are shown in a simplified form as compared to their practical structures for the sake of description. Further, hereafter, packets 202-1 to 202-u, which are repackaged according to a predetermined format on the basis of a transmission parameters determined in wireless terminals, are referred to as "frames".

The AP shown in FIG. 3 includes a transmission (Tx) frame controller 105 and a transmission (Tx) signal generator 106. The Tx frame controller 105 reads out from a Tx buffer 204 packets destined to a plurality of terminals, issues to the Tx signal generator 106 instructions on a transmission parameter representative of how to generate a frame, and adds a control information bit to a bit stream constituting a packet to be transmitted, for supply to the Tx signal generator 106. The Tx signal generator 106 generates transmission frames 202-1 to 202-u on the basis of the transmission parameter and transmission bit streams as received by adding additional bits required by a communication system and header information which will be necessary for restoring reception signals. Further, the Tx signal generator 106, after mapping to transmission signals bit streams constituting the frames, performs a transmission signal processing, and converts the frames to a radio frequency signals for transmission from transmission antennas 103-1 to 103-m.

In the UTs 102-1 to 102-u shown in FIG. 3 serving as receiving ends, radio signals received are restored to bit steams at signal restoration units 107-1 to 107-u for supply to Rx frame controllers 108-1 to 108-u. In the Rx frame controllers, the received bit streams are analyzed by making use of the header information and the additional bits to restore packets, so that reception (Rx) data 203-1 to 203-$u$ are taken out therefrom and are supplied to reception (Rx) buffers 205-1 to 205-$u$.

In the transmission signal processing in the AP, SDMA processing is carried out so that transmission signals transmitted in parallel to the plural UT's UT1 to UTu are separable at each of the UTs, which are receiving ends, from those signals destined to the other UTs. For UTs having a single antenna, or for UTs having a plurality of antennas but having no function to perform reception signal processing of signals received with the plural antennas, the SDMA processing at the transmission end should be such that the transmission signals are separable at antennas 104-1 to 104-$u$. For UTs having a plurality of antennas and having a function to perform reception signal processing of signals received with the plural antennas, the transmission signals transmitted in parallel may not be separable at the antennas and may be separated through the reception signal processing in the UTs.

The SDMA processing in the AP is effected on the basis of information on the channels between the AP and UTs. The information on the channels or the channel information may be predicted from given training signals communicated between the AP and UTs, or alternately, channel information predicted on the UT side may be reported to the AP side.

Figure 4:
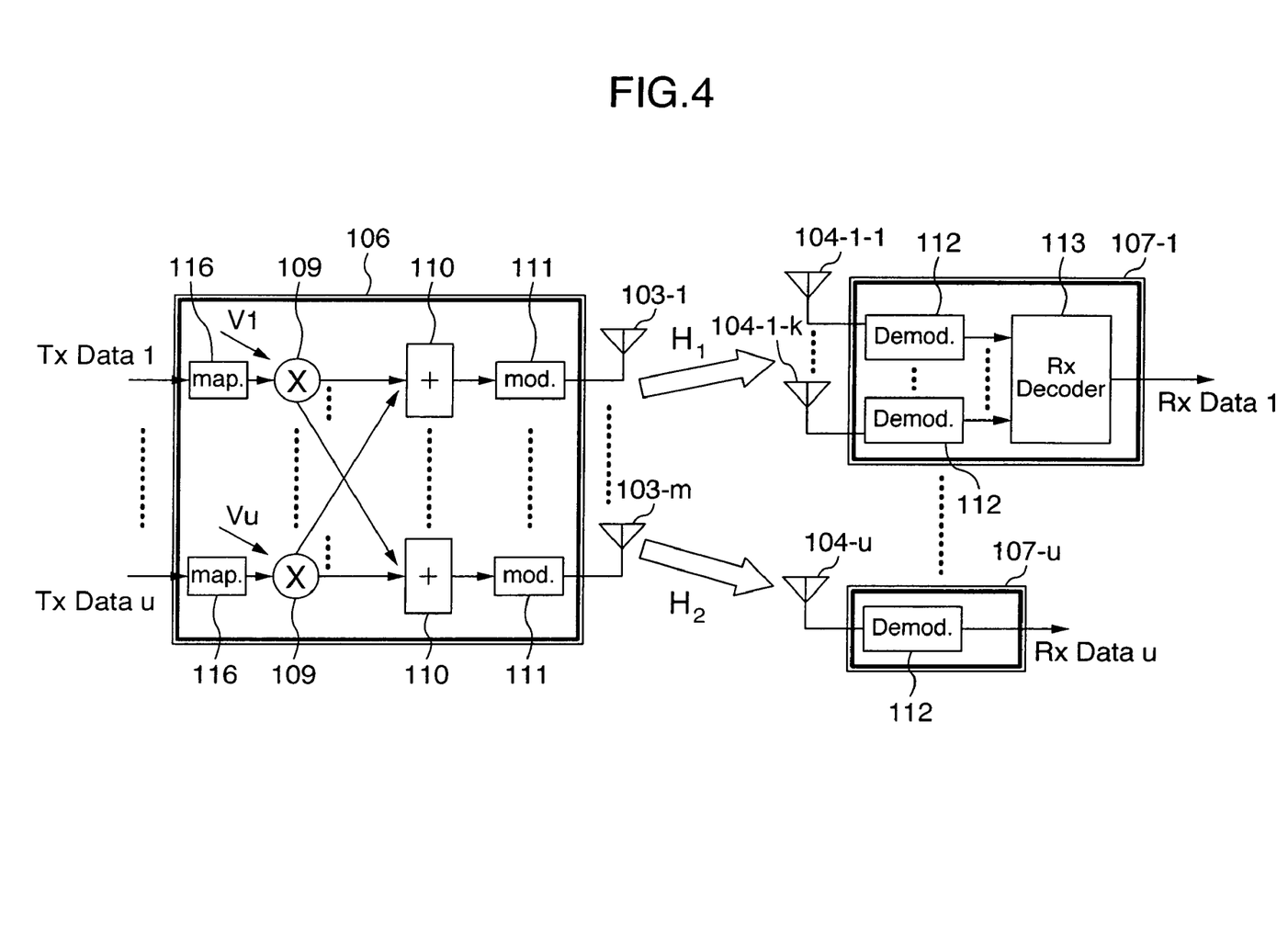
FIG. 4 is a diagram showing a transmission signal processing unit and a reception signal processing unit in a wireless communication system according to an embodiment of the present invention.

FIG. 4 is as block diagram of the Tx signal generator 106 and the signal restoration units 107-1 to 107-$u$ which may be used in a wireless communication system according to an embodiment of the present invention. The Tx signal generator 106 carries out mapping of transmission bit streams to transmission signals and an SDMA processing of the transmission signals. In the Tx signal generator 106, first, bit streams Tx Data 1 to Tx Data u supplied from the Tx frame controller 105 are mapped (116) to transmission signals. The SDMA processing of the transmission signals performs multiplication (109) of the mapped transmission signals and weight vectors V1 to Vu issued from the controller 105 so that the complex amplitudes of transmission signals are varied for distribution to transmission antennas 103-1 to 103-$m$ and then the transmission signals are subjected to combination at combiners 110. When the communication system supports a variable data rate, the primary modulation may be effected, at the time of the mapping (116) of the bit streams, on the basis of the data rate issued from the Tx frame controller 105. After the combination, the transmission signals are modulated and up-converted by modulators 111 and are intensified by amplifiers for radiation from the antennas 103-1 to 103-$m$.

Each of the signal restoration units 107-1 to 107-$u$ has at least one antenna. Any of the signal restoration units that has two or more antennas 104-1-1 to 104-1-$k$ demodulates reception signals at demodulators and the demodulated signals are subjected to processing at a reception (Rx) signal processing unit (Rx decoder) 113 which serves to separate or combine signals received by the plurality of antennas, whereby a reception signal (Rx Data 1) is extracted. In UTs having a single antenna, or in UTs having a plurality of antennas but having no function of reception signal processing of signals received with the plural antennas, the signal(s) received by the antenna(s) is (are) demodulated by a demodulator to extract a received data. When the communication system supports a variable data rate, the manner of demodulation may be determined on the basis of the header information as demodulated.

The transmission parameters to be supplied from the Tx frame controller 105 to the Tx signal generator 106 are parameters concerning the factors, such as, for example, timing of signal transmission/reception, data size or data length of a frame or data rate, which determine a time duration of a transmission frame. It is preferable that the Tx frame controller 105 also possesses values for the data rates necessary for the modulation of transmission signals in the Tx signal generator 106 and values for the weight vectors necessary for the SDMA processing. When the Tx frame controller 105 possesses values for the data rates and values for the weight vectors, these parameters will be supplied, along with the bit streams constituting the transmission frames, to the Tx signal generator 106.

The Tx frame controller 105 receives packets destined to the respective UTs and is capable of optionally determining the data rates and data sizes for those packets. Usually, the data size or data length of a frame is determined so as to be of a value identical with that of a transmission packet, but when a packet has a data size larger than a predetermined one, it will be possible to fragment or divide the single packet into plural frames for transmission. Further, when frames destined to a plurality of UTs are transmitted in parallel under the SDMA scheme, the data rate for each frame is determined on the basis of the channel conditions obtained from a channel matrix between each UT and the AP, thereby to make maximum the transmission efficiency. However, as describe above, it is usual that, even under optimum conditions determined by the channel condition, the packet communication system will not always enjoy the maximum transmission efficiency due to the differences in transmission time duration between a plurality of frames to be simultaneously transmitted.

In one aspect of the present invention, the transmission frame controller has a function to predict, from the data sizes of packets and the data rates, the transmission time duration of each of the frames to be simultaneously transmitted under the SDMA scheme, and a function to fragment or divide the plurality of packets into a plurality of frames, when the predicted transmission time durations are different, on the basis of differences between the shortest one of the predicted transmission time durations and other predicted transmission time durations. For the data size, use may be made of what is included in the header of a packet. The data rate is determined by the AP on the basis of the channel information at the time when the AP transmits a frame, or is determined by the use of instructions issued from an application, or is determined by the use of predetermined one such as a data rate employed in the former transmission.

The fragmentation or division of a packet will be realized in such a manner that the transmission frame controller modifies a parameter concerning the transmission data length to be supplied to the transmission signal generator and information representing that the packet has been fragmented is described in the header. Further, by dynamically changing the fragmentation data size, with which packet fragmentation is carried out when the transmission data size of a packet is too large, on the basis of the shortest transmission time duration, it is also possible to transmit all of the packets to be simultaneously transmitted in such a state that they are fragmented into a plurality frames.

Figure 5:
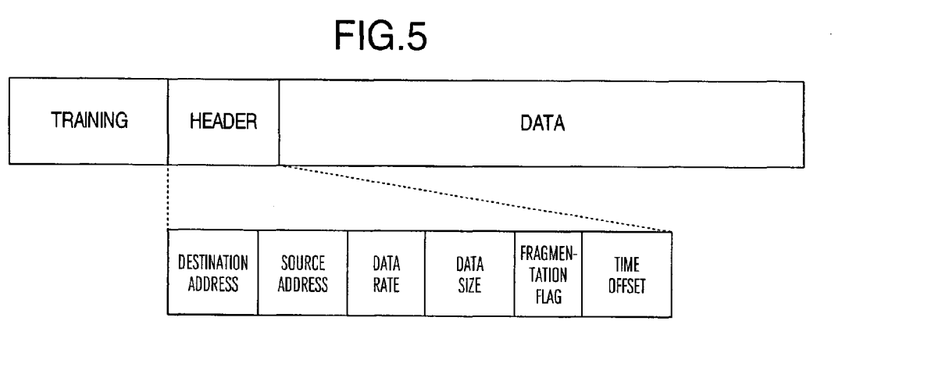
FIG. 5 is a diagram showing an example of a structure of a frame which may be employed in a wireless communication system according to an embodiment of the present invention.

FIG. 5 shows a structure of a frame which may be employed in a wireless communication system according to an embodiment of the present invention. In FIG. 5, the frame structure shown is simplified as compared to a practical one for the sake of explanation. In the communication according to this embodiment, a parameter concerning a packet transmission time duration for determining transmission/reception timing is necessary, and any frame structure other than that shown in FIG. 5 may be adopted provided that the frame structure includes information necessary for deriving the transmission time duration. Further, when the packet fragmentation or division scheme is employed, a parameter indicative of a packet being fragmented or divided will be necessary. In the frame structure shown in FIG. 5, a data rate and a frame data size are described so that a time duration necessary for transmitting the frame is obtained from these parameters. The fragmentation flag shown is a piece of information indicating that the packet has been fragmented. This fragmentation information may merely indicate that the packet has been fragmented or may indicate that the frame following this fragmentary frame is the remaining fragmentary frame.

Further, in this embodiment, when the wireless communication system does not allow optional modification of transmission timing for control frames such as an acknowledgement (ACK), the optional modification of transmission timing being for simultaneous transmission of data having different transmission time durations, it is preferable that the header includes offset information with which it is possible to delay transmission timing of those control frames. It should be noted, however, that according to one feature of the present invention, it is possible to accomplish communication without the offset information by precisely controlling the packet transmission time duration and receiving, in a fragmented state, a plurality of signals transmitted from a plurality of user terminals (UT), at the access point apparatus (AP).

Figure 6:
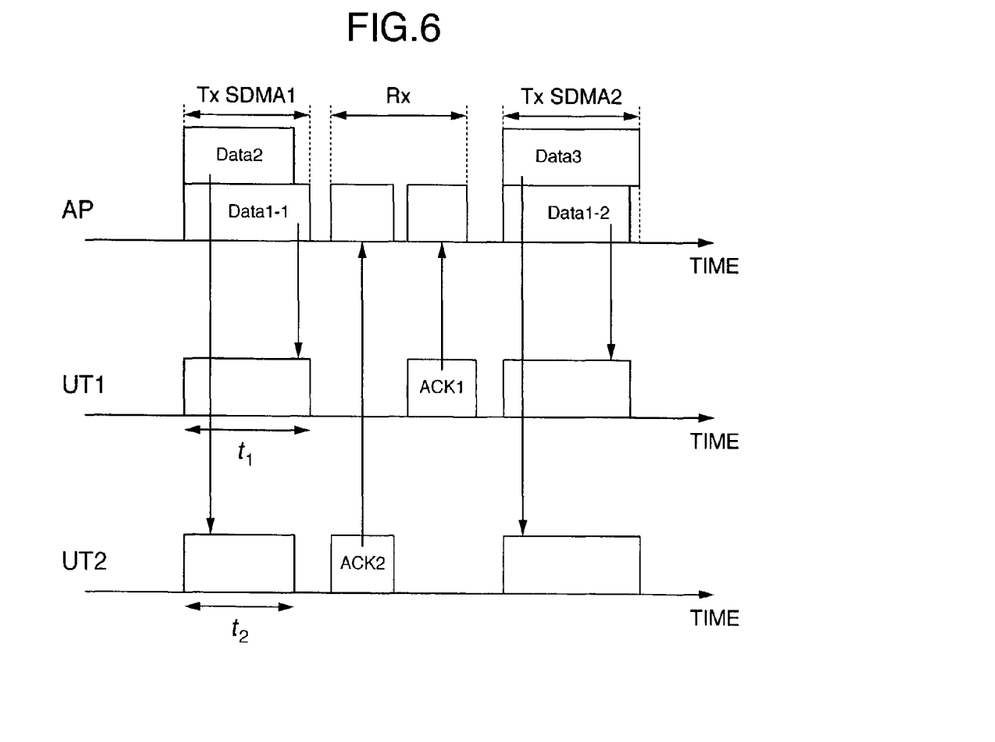
FIG. 6 is a time chart illustrating frame transmission and reception under the SDMA transmission scheme, according to an embodiment of the present invention.

FIG. 6 is a time chart illustrating frame transmission and reception when a plurality of packets are transmitted, similarly to the case shown in FIG. 2, according to an embodiment of the present invention. Here, only two UTs are shown, but this embodiment is equally applicable to the case where three or more UTs are involved. In FIG. 6, Data 1-1 and Data 1-2 represent frames generated by fragmenting one packet Data 1, the fragmentation being effected on the basis of a difference between the transmission time duration of the frame Data 1 and the shortest transmission time duration of a frame Data 2 among frames to be simultaneously transmitted. As shown in FIG. 6, by fragmenting the Data 1 so that the fragmentary frame Data 1-1 and the frame Data 2 are close to each other in transmission time duration (their frame transmission time durations are close to each other), it is possible to release the channel quickly and to SDMA transmit the remaining fragmentary data Data 1-2 simultaneously with a next packet (frame Data 3) destined to a user terminal UT2, to thereby improve the multipath route utility efficiency per unit time.

Although the frame Data 1-2 is SDMA transmitted along with a new frame Data 3 destined to the user terminal UT2 in FIG. 6, it may be independently transmitted without resorting to the SDMA. Further, the frame Data 1-2 may be transmitted with a transmission weight different from that for former transmission, by using a newly obtained channel matrix or its predicted value. Further, the first fragmentary frame Data 1-1 may be transmitted along with a channel information request frame prior the SDMA transmission, and thereafter, the remaining fragmentary frame Data 1-2 may be transmitted along with the frame destined to another user terminal by the use of an obtained channel matrix.

In the communication system under the time division scheme, a slot (such as Tx SDMA1 or Tx SDMA2 shown in FIG. 6) is defined as a time duration during which a frequency band is occupied by one transmission. Normally, in the packet mode communication, the one slot as defined is identical with a transmission time duration of a transmission packet. In the this embodiment, since one AP transmits a plurality of frames in parallel, the one slot is identical with the longest one of the transmission time durations of the plurality of frames transmitted in parallel, or is determined in accordance with the longest transmission time duration.

The measures taken for dynamically fragmenting packets in the embodiment described with reference to FIG. 6 suppress a time duration in which the multipath route is free or unused, thereby increasing the transmission efficiency. It should be noted, however, that, in these measures in which a packet is fragmented into two, it is necessary to provide two pieces of header information for the data payload length of a single packet. Further, as shown in FIG. 6, in a system requiring an acknowledgement ACK for each transmission, an ACK is added between transmissions of the two fragmentary frames with a result that a transmission time duration will be increased by a sum of a time duration of such one ACK and a time duration of twice the minimum interval of frame transmission. This refers to a case in which one AP communicates with two UTs and the AP receives one ACK for each of the UTs, ensuring a minimum value for a frame time length. An increase in the transmission time duration in other cases will also be estimated in a similar manner. Further, an increase in the transmission time duration in a case in which one packet is fragmented into more than two will also be estimated in a similar manner.

Thus, from the viewpoint of the total throughput, it will be preferable to carry out the packet fragmentation only under the conditions that meritorious effects owing to the improvement of the multipath route utility efficiency due to the packet fragmentation exceeds an increase in the transmission time duration due to the packet fragmentation. Namely, it is desirable from the viewpoint of the total throughput that the minimum transmission time duration Tmin on which the packet fragmentation is based and the free time on the multipath route $\Delta T$ suppressed by the packet fragmentation are larger than the increase dT in the transmission time duration due to the packet fragmentation.

Figure 7:
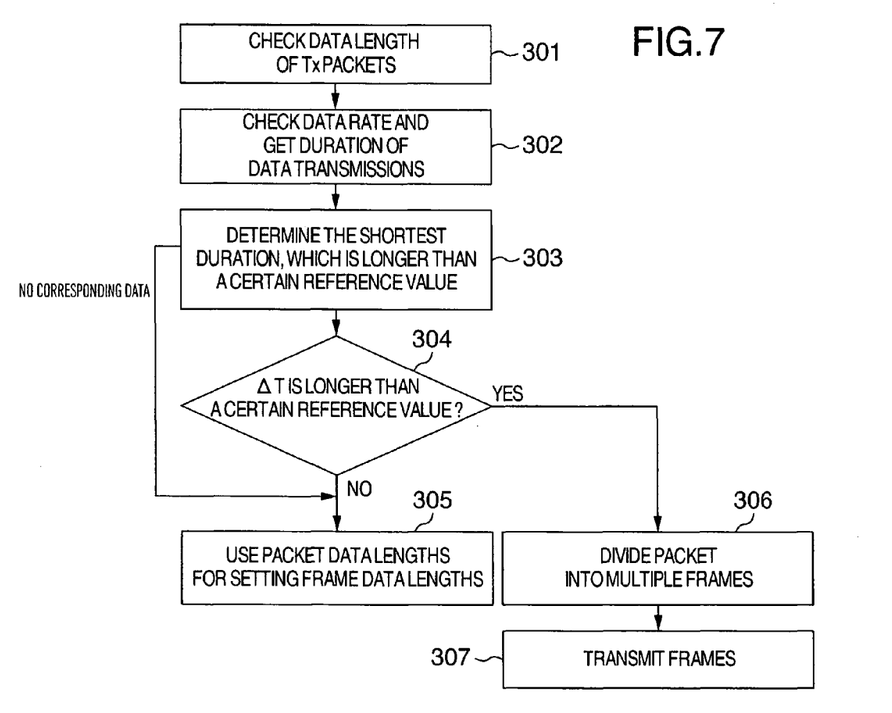
FIG. 7 is a flowchart of SDMA transmission according to the embodiment described with reference to FIG. 6.

FIG. 7 is a flowchart according/to the embodiment described with reference to FIG. 6, in which the increase in the transmission time duration at the packet fragmentation is taken into consideration. The respective steps shown in FIG. 7 are carried out for all of the packets to be transmitted in parallel under the SDMA scheme. These steps may also be carried out for all of the packets in the buffer which are left in the buffer to be transmitted thereafter.

As shown in FIG. 7, first, the data lengths of transmission packets are checked in step 301, and data rates of of the transmission packets are checked to determine their transmission time durations in step 302. In principle, when the data rates and the data sizes (data lengths) are determined, it will be possible to predict the transmission time durations. However, in the strict sense, a transmission time duration changes depending not only on the packet data length, but also on the header added at the packet transmission and additional bits necessitated by a communication system in use. Therefore, when the transmission frame controller 105 does not possess these information, the transmission frame controller may receive information on the transmission time duration from the transmission generator 105 through an interface 114 (FIG. 3).

In step 303, a minimum transmission time duration Tmin which is referred to in the packet fragmentation is determined. As the minimum transmission time duration, the minimum one of the time durations not smaller than a value Ta, which is required to be employed as a reference at the time of the packet fragmentation, is selected. If the transmission time durations of all of the packets do not conform with these conditions, the packet fragmentation is not effected (step 304). After the minimum transmission time duration has been determined, the free time $\Delta T$ to be suppressed by the packet fragmentation is determined from the minimum transmission time duration and the transmission time duration of each packet, and if the free time ΔT is longer than a certain reference value Tb (step 304), a packet under consideration will be fragmented into plural frames (step 306), and the fragmentary frames are transmitted (step 307). Otherwise, a packet will be transmitted without fragmentation (step 305). In the respective steps including the judging step shown in FIG. 7, a decision may be made as to whether the transmission should be made under SDMA scheme or under the time division scheme. In practice, values for Ta and Tb used in determining Tmin and ΔT may be determined, for example, in such a manner that, taking the above-mentioned increase dT in the transmission time duration due to the packet fragmentation into consideration as a reference, Ta=Tb>1.5xdT.

Although consideration only from the point of the increase in the transmission time duration due to the packet fragmentation will result in that the minimum values of both of Tmin and ΔT will be the same which are based on dT, they may assume values different form each other. In practice, it will be possible that Tmin assumes a value determined by taking overheads experienced with the SDMA into consideration. This is, however, a conclusion which may be reached when only time resources are considered. By considering other aspects such as changes in the data rate, the QOS (Quality Of Service) and easiness of processing, the packet fragmentation may be carried out by using as a reference the minimum transmission time duration smaller than the increase ΔT in the transmission time duration due to the packet fragmentation, or the packet fragmentation may be carried out for the purpose of a multipath route free time to be suppressed which is smaller than ΔT.

For example, when one of the UTs to which frames are transmitted in parallel operates with a real time application having strict requirements concerning the delay time, frame transmission may be controlled with a QOS such that transmission frames to terminals other than the one UT are fragmented irrespective of an increase in Tmin, ΔT or the total throughput so that the intervals of frame transmission to the one UT are not large. Further, since the minimum data size of the packet is properly determined for each communication system, it will be of no use to fragment a packet into sizes smaller than a certain value. Thus, it may be preferable to simply apply the above-described processing to any packet that has a data size larger than a predetermined one.

The steps 301 to 304 shown in FIG. 7 are performed in the transmission frame controller 105. When a packet is fragmented or divided into a plurality of frames in step 306, the transmission controller 105 adds to the header a bit representing that the packet fragmentation or division has been effected, so that the transmission frame controller of a user terminal (108-1 of UT-1, for example) decides from demodulated header information that the packet has been fragmented or divided. After reception of all of the fragmentary packets, the transmission controller puts together the fragmentary packets to restore the original packet.

Another embodiment will next be described. In the embodiment described with reference to FIGS. 6 and 7, the transmission frame control is performed in such a manner that a frame Data having a shortest one of the transmission time durations of packets simultaneously transmitted under the SDMA scheme is referred to in order to reduce the transmission time durations of the other frames Data. In the another embodiment described hereafter, the transmission frame control is performed in such a manner that a frame Data having a long transmission time duration is referred to in order to make longer the transmission time durations of the other frames Data. When the transmission time durations of simultaneously transmitted frames are modified or adjusted through aggregation, an amount of data transmitted with one frame will be increased, thereby to relatively reduce transmission overheads with respect to the data amount.

Thus, from the viewpoint of the communication capacity, it will be possible that this embodiment will offer greater effects as compared to the packet fragmentation scheme. It should be note, however, that in this embodiment, it is prerequisite that packets to be subjected to the aggregation are stored in the transmission (Tx) buffer, and that care should be directed to the upper limit of the transmission packet size by the system requirements and to the extent of degradation of the communication capacity at the time of packet losses.

Figure 8A:
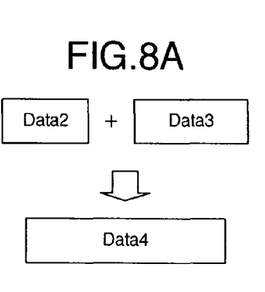
FIG. 8A is a diagram illustrating the manner of generation of a frame in an SDMA transmission according to an embodiment of the present invention.
Figure 8B:
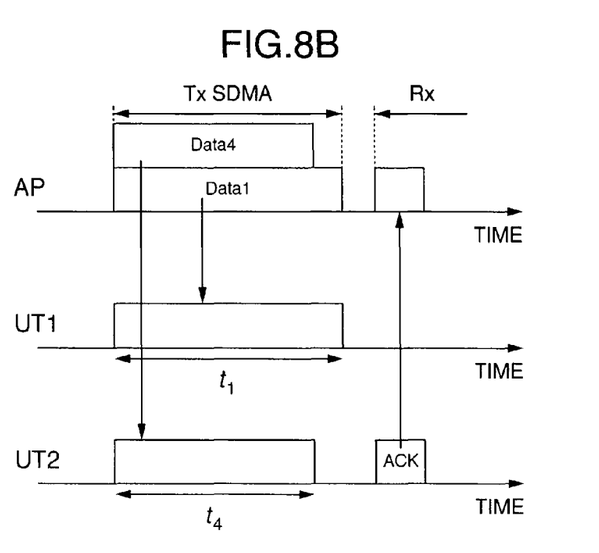
FIG. 8B is a time chart of frame transmission and reception under the SDMA transmission scheme, showing cooperatively with FIG. 8A the embodiment of the present invention.

FIG. 8B is a time chart of frame transmission and reception performed when a plurality of packets are transmitted, similarly to the case shown in FIG. 2, in accordance with the another embodiment. In FIG. 8B, a frame Data 4 represents a frame generated by aggregating the data packet of a frame Data 2 and the data packet of a frame Data 3 into a single packet to form a frame, the frames Data 2 and Data 4 being destined to the same terminal UT2 (FIG. 8A). The frame Data 4 is a frame generated by combining the originally two packets into one and is made separable by one of the following measures: one including addition of packet aggregation information to the header and reporting of a location of the boundary between the two packets; and the other one including addition of a predetermined additional bit stream to the boundary between the two packets.

Figure 12:
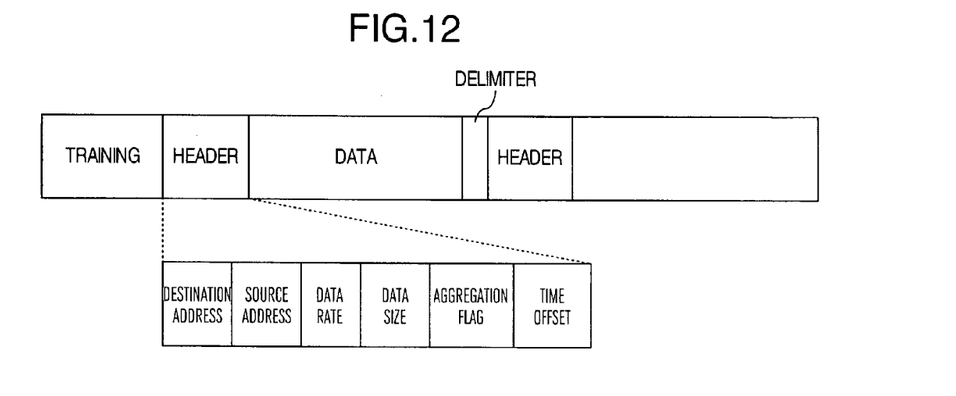
FIG. 12 is a diagram showing an example of a structure of a frame which may be employed in a wireless communication system according to an embodiment of the present invention.

FIG. 12 is a diagram showing an example of a structure of a frame which may be employed in the above-mentioned embodiment described with reference to FIGS. 8A and 8B. The additional information for restoration of a packet after reception of the frame may be simplified in compliance with the procedures carried out between the AP and UTs. A packet to be aggregated such as the frame Data 3, which is destined to UT2 as shown in FIG. 8A may be, for example, selected from the packets in the Tx buffer 204 in the AP shown in FIG. 3. Alternately, a packet to be aggregated may be selected from fragmentary packets into which a packet destined to another UT2 is optionally divided or fragmented.

The transmission time duration which is referred to in effecting the aggregation in the present embodiment is the longest one of the transmission time durations of the frames simultaneously transmitted under the SDMA transmission scheme. Since too long a channel occupation time may lower the quality of a communication system, it is preferable to establish a maximum value for the transmission time to be referred to so that a possible longest transmission time duration not longer than the established maximum value should be employed. For example, the maximum value for the transmission time duration to be referred to may be such a value that will ensure the reliability of the channel information used for the SDMA.

In the present embodiment, from the viewpoint of the total throughput, the decision as to the size of a packet which may be selected for the aggregation should be made to the effect that the multipath route free time caused by the aggregation at the SDMA transmission is smaller than the multipath route free time suppressed by the aggregation. Alternately, taking as an example the case shown in FIGS. 8A and 8B, selection of packets to be aggregated may be simply such that the frame transmission time duration $t_4$ after aggregation does not exceed a reference transmission time duration $t_1$. This is, however, a conclusion which may be reached when only time resources are considered. By considering other aspects such as changes in the data rate, the QOS (Quality Of Service) and easiness of processing, the packet aggregation may be carried out in such a manner that a particular packet is excepted from the aggregation, or in such a manner that the multipath route free time caused by the aggregation at the SDMA transmission is larger than the multipath route free time suppressed by the aggregation. Further, the selection of a packet to be aggregated may be effected, without resorting to the transmission time duration, in such a manner that the data size of a sum of the aggregated packets is smaller than a predetermined value.

In FIG. 8B, one slot is determined in accordance with a frame having a longest transmission time duration as a result of the aggregation processing of a packet destined to any of the UTs.

Figure 9:
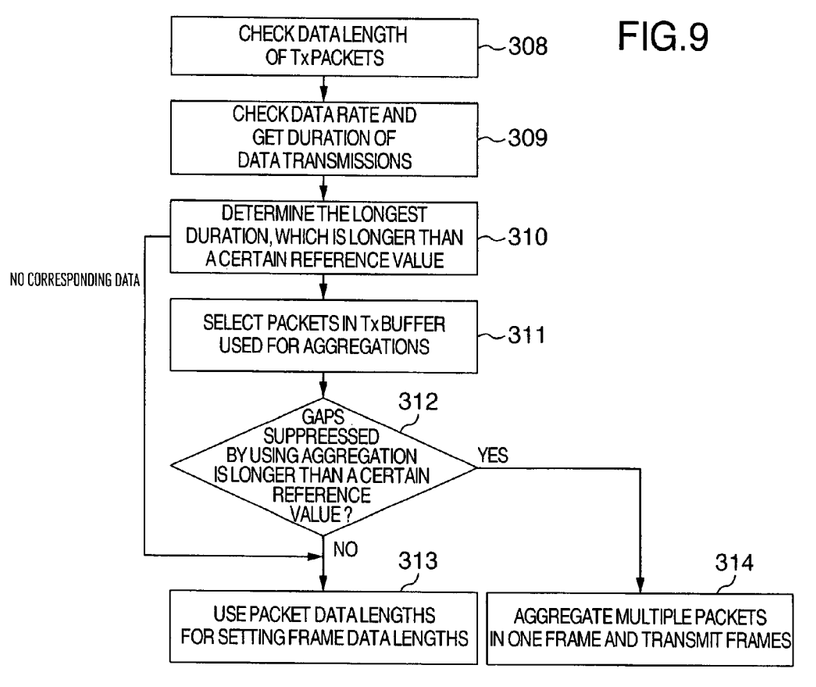
FIG. 9 is a flowchart of the SDMA transmission according to the embodiment described with reference to FIGS. 8A and 8B.

A flowchart according to the above-described embodiment is shown in FIG. 9. In step 311, the search of the buffer for the determination of the packet which is transmitted by using SDMA may be a partial search of the buffer in which a predetermined number of packets are searched, without going through the packets in the whole buffer. Further, it may be decided, in consideration of the respective processing steps and decision step, whether the packet transmission to a plurality of UTs be performed under the SDMA scheme or under the time division scheme. The steps 308 to 312 shown in FIG. 9 are performed in the transmission frame controller 105 (FIG. 3).

When a plurality of packets are aggregated for transmission in step 314, the transmission frame controller 105 adds to the header a bit representing that packet aggregation has been effected and reports a location of the boundary between two packets, or alternately, the controller 105 adds a predetermined bit stream to the boundary between the two packets (FIG. 12). The reception frame controller (108-1 in FIG. 3, for example) of a UT decides from a demodulated header information that the received packet is an aggregated one, separates it into a plurality of packets and restores the original packets therefrom. When aggregated packet includes data destined to another user terminal, the reception frame controller of the user terminal under consideration takes in only the packet destined thereto, discarding the other packets.

Still another embodiment of the present invention will next be described. In the embodiments heretofore described above, the data amount to be transmitted in one frame is modified through the packet fragmentation or packet aggregation to make the transmission frame lengths generally uniform. In contrast, in this embodiment, the data rates are modified to adjust the time duration necessary for transmission to make the transmission frame lengths close to each other. With the modification of the data rates to adjust the transmission time durations of frames to be transmitted in parallel, the resolution with which the frame length adjustment is carried out depends on the amount of adjustment of the variable data rate in a communication system, and an optimum data rate is decided from the channel condition. Therefore, the degree of freedom of the transmission time duration may be lower as compare to the embodiments heretofore described, but this embodiment provides effective measures in that there is no need to perform the packet fragmentation and packet aggregation necessary for such processing that does not directly relate to data communication itself.

Figure 10A:
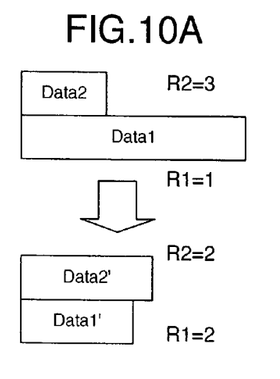
FIG. 10A is a diagram illustrating the manner of generation of a frame in an SDMA transmission according to an embodiment of the present invention.
Figure 10B:
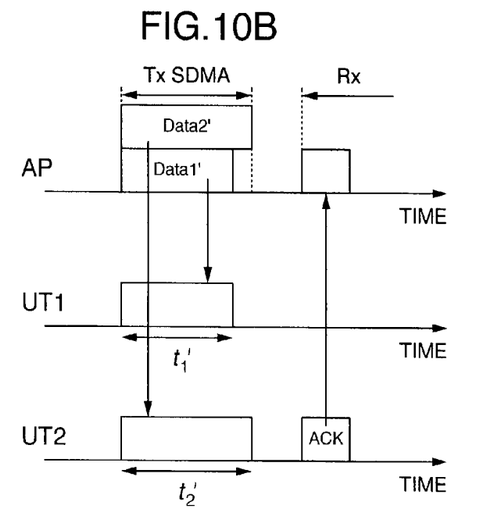
FIG. 10B is a time chart of frame transmission and reception under the SDMA transmission scheme, showing cooperatively with FIG. 10A the embodiment of the present invention.

FIG. 10B is a time chart of frame transmission and reception in which transmission of a plurality of packets as in FIG. 2 are performed according to the still another embodiment. In FIG. 10B, two UTs are shown for the sake of explanation, but the present embodiment is equally applicable to the case where three or more UTs are involved. Referring to FIG. 10B, it is confirmed that there is a difference between the transmission time durations of the frame Data1 to UT1 and the frame Data2 to UT2 when they are transmitted at predetermined data rates, and the data rates for the respective frames are changed in order to suppress the multipath route free time caused by the SDMA transmission. Here, the predetermined data rate may be, for example, a data rate instructed to use by an application, a data rate continuously employed as in a data transmission history or a data rate which has been determined to the effect that the total throughput is optimized on the basis of predicted channel information.

In FIG. 10A, R1 represents a data rate for a frame to UT1, while R2 represents a data rate for a frame to UT2. The predetermined data rates R1 and R2 are such that R2 is three times as great as R1. As shown in FIGS. 10A and 10B, as a result of the modification of the predetermined data rates according to this embodiment, the data rates R2 and R1 become equal to each other. Although the data rate for the frame Data 2' to the UT2 is lowered to degrade the communication capacity for the data stream to the UT2, the multipath route free transmission time is suppressed so that the total throughput in which all of the UT1 and UT2 are taken into consideration can be improved.

In the embodiment described with reference to FIGS. 10A and 10B, one slot is determined in accordance with a frame having the longest one of the transmission time durations of the frames after modification of their data rates.

The modification of the data rate may be achieved by changing the coding rate for the error correction to vary the redundancy of the original data or by changing allocated power to vary the number of modulation levels. Since the optimum value for the data rate employed in the communication is determined by the channel condition, a further optimized data rate can be selected by varying the transmission weights adopted or the transmission signal processing in the AP and changing the multipath route to be used.

When a terminal having a function to perform reception signal processing by use of signals received with a plurality of antennas (this terminal being referred to as "UTa" for convenience sake) is included in the terminals to which frames are to be transmitted in parallel, it is possible to modify the data rate by changing the number of streams to be allocated to the terminal UTa. For example, assuming, for simplicity sake, that the data rate for one stream is constant, the number of steams allocated to the terminal UTa may be 1 in one case and may be 2 in another case, whereby the data rate can be changed in such a degree as twice the value. In this connection, if the allowable range of the channel condition in communicating with the terminal UTa becomes too large, the transmission weights should be changed so as to improve the channel condition for other terminals, whereby it will be possible to improve the total throughput of the overall system. When the data rate is modified, the data rate information in the header should be re-written so as to be coincident with the data rate after the modification, or alternately, the parameters to be used in generating the header should be set so as to be coincident with the data rate after the modification.

Figure 11:
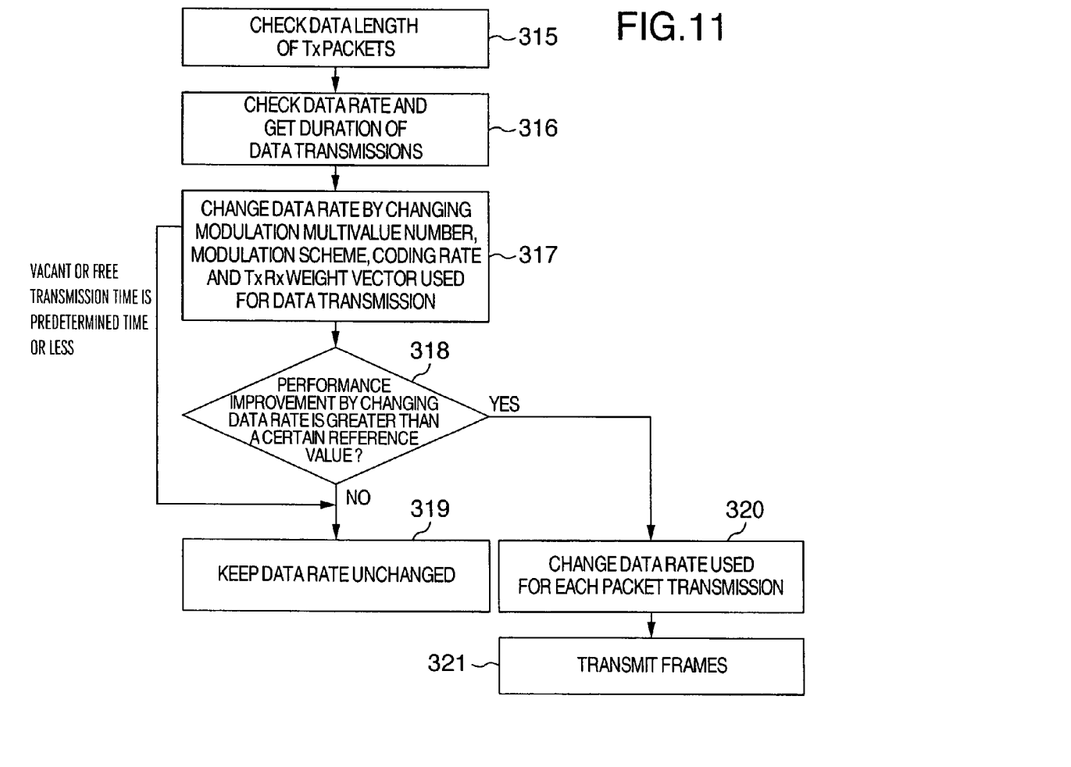
FIG. 11 is a flowchart of the SDMA transmission according to the embodiment described with reference to FIGS. 10A and 10B.

FIG. 11 is a flowchart according to the embodiment described above with reference to FIGS. 10A and 10B. In FIG. 11, in steps 315 and 316, transmission time durations of transmission frames to be transmitted in parallel are predicted and the throughput in consideration of the multipath route free time due to differences in the transmission time duration is estimated. In step 317, the throughput is predicted when the data rate is modified so as to suppress the multipath route free time. If an increase of the throughput is not smaller than a predetermined one (step 318), the data rate is modified (step 320), and a frame is transmitted (step 321).

The communication performance to be improved as a result of modification of the data rate may be, other than the throughput, for example, the throughput of a particular terminal based on the delay time or the QOS. Further, it may be decided, in consideration of the respective processing steps and decision step, whether the packet transmission to a plurality of UTs be performed under the SDMA scheme or under the time division scheme. The steps 315 to 318 shown in FIG. 11 are performed in the transmission frame controller 105 (FIG. 3).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication method in a communication system in which an access point achieves packet communications with a plurality of user terminals under the SDMA (Space Division Multiple Access) scheme, comprising the steps of:
    a first step of predicting transmission time durations necessary for transmitting a plurality of transmission packets destined to a plurality of user terminals to which parallel data transmission is performed in one slot under the SDMA scheme;
    a second step of determining, on the basis of said predicted transmission time durations for said plurality of transmission packets, a transmission parameter for said transmission packets to be transmitted in said one slot, the transmission parameter being a data size per one transmission frame; and
    a third step of aggregating packets that share a same destination from the plurality of transmission packets to generate transmission frames to be transmitted in said one slot to said plurality of user terminals on the basis of said determined transmission parameter, adding control information to a header of each transmission frame indicating that the transmission frame includes the aggregated packets of the transmission frame, and transmitting said transmission frames.

2. A method according to claim 1, wherein:
    the transmission parameter determined in said second step is a data size of a packet per one transmission frame; and
    in said third step, at least one of said plurality of packets is fragmented into a plurality of fragmentary packets to generate said transmission frames.

3. A method according to claim 1, wherein the transmission parameter for said plurality of transmission packets is determined on the basis of a shortest one of the transmission time durations of the transmission packets to be transmitted to said plurality of user terminals in said one slot.

4. A method according to claim 2, wherein, after a first transmission frame including said fragmentary packets has been SDMA transmitted in parallel with a transmission frame including a plurality of other packets, a transmission weight vector is changed and a transmission frame including the remaining fragmentary packets is transmitted with said changed transmission weight vector.

5. A method according to claim 4, wherein the transmission parameter for said plurality of transmission packets is determined on the basis of a QOS (Quality Of Service) data of the transmission packets to be transmitted in said one slot.

6. A method according to claim 1, wherein the prediction of the transmission time durations of said transmission packets in said first step is based on data sizes of said transmission packets.

7. A method according to claim 1, wherein:
    in said second step, said determined transmission parameter includes data rates to be used in transmitting the respective transmission packets; and
    in said third step, at least one of said transmission packets is transmitted at a data rate different from a predetermined data rate.

8. A method according to claim 1, wherein the determination of the transmission parameter for said plurality of transmission packets in said second step is carried out by changing transmission weight vectors in a transmission signal processing in said access point, by changing reception weight vectors in a reception signal processing in said user terminals, by changing a coding rate for error correction of transmission data, by changing a number of modulation levels, or by changing a modulation scheme.

9. A method according to claim 1, wherein, in said second step, the determination of the transmission parameter for said plurality of transmission packets is carried out by optimizing a degree of suppression of a free time of multipath route caused in a SDMA transmission, a total throughput of said communication system, or a degree of suppression of a maximum delay time in said communication system.

10. An access point apparatus in which the access point apparatus achieves packet communications with a plurality of user terminals under the SDMA (Space Division Multiple Access) scheme, the apparatus comprising:
    a transmission frame controller for predicting transmission time durations necessary for transmitting a plurality of transmission packets destined to a plurality of user terminals to which parallel data transmission is performed in one slot under the SDMA scheme and determining, on the basis of said predicted transmission time durations for said plurality of transmission packets, a transmission parameter for said transmission packets to be transmitted in said one slot, said transmission parameter being a data size per one transmission frame;
    a transmission signal generator for aggregating packets that share a same destination from the plurality of transmission packets to generate transmission frames to be transmitted in said one slot to said plurality of user terminals on the basis of said determined transmission parameter and delivering said transmission frames and adding control information to a header of each transmission frame indicating that the transmission frame includes the aggregated packets of the transmission frame; and
    an antenna unit for transmitting said transmission frames delivered by said transmission signal generator to said plurality of user terminals under the SDMA scheme.

11. An apparatus according to claim 10, wherein:
    said determined transmission parameter is a data size of a packet per one transmission frame; and
    in said transmission signal generator, at least one of said plurality of packets is fragmented into a plurality of fragmentary packets to generate said transmission frames.

12. An apparatus according to claim 10, wherein the transmission parameter for said plurality of transmission packets is determined on the basis of a shortest one of the transmission time durations of the transmission packets to be transmitted to said plurality of user terminals in said one slot.

13. An apparatus according to claim 11, wherein said transmission signal generator, after having SDMA transmitted a first transmission frame including said fragmentary packets in parallel with transmission frames including a plurality of other packets, changes a transmission weight vector and transmits a transmission frame including the remaining fragmentary packets with said changed transmission weight vector.

14. An apparatus according to claim 13, wherein the transmission parameter for said plurality of transmission packets is determined on the basis of a QOS (Quality Of Service) data of the transmission packets to be transmitted in said one slot.

15. An apparatus according to claim 9, wherein said transmission frame controller predicts the transmission time durations of said transmission packets on the basis of data sizes of said transmission packets.

16. An apparatus according to claim 9, wherein:
said determined transmission parameter includes data rates to be used in transmitting the respective transmission packets; and
said transmission signal generator generates said transmission frames by applying to at least one of said transmission packets a data rate different from a predetermined data rate.

17. An apparatus according to claim 9, wherein the determination of the transmission parameter for said plurality of transmission packets is carried out by changing transmission weight vectors in a transmission signal processing in said access point, by changing reception weight vectors in a reception signal processing in said user terminals, by changing a coding rate for error correction of transmission data, by changing a modulation multivalue number, or by changing a modulation scheme.

18. An apparatus according to claim 9, wherein the determination of the transmission parameter for said plurality of transmission packets is carried out by optimizing a degree of suppression of a free time of multipath route caused in a SDMA transmission, a total throughput of said communication system, or a degree of suppression of a maximum delay time in said communication system.

* * * * *

UNITED STATES PATENT AND TRADEMARK OFFICE
CERTIFICATE OF CORRECTION

| | | |
|---|---|---|
| PATENT NO. | : 8,363,634 B2 | Page 1 of 1 |
| APPLICATION NO. | : 11/797180 | |
| DATED | : January 29, 2013 | |
| INVENTOR(S) | : Yamamoto et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1489 days.

Signed and Sealed this
Eleventh Day of November, 2014

Michelle K. Lee
*Deputy Director of the United States Patent and Trademark Office*